United States Patent [19]
Dochovna

[11] Patent Number: 5,661,509
[45] Date of Patent: Aug. 26, 1997

[54] APPARATUS AND PROCESS FOR PRINTING LARGE GRAPHICS

[75] Inventor: Rami Yoram Dochovna, Petach Tikva, Israel

[73] Assignee: Nur Advanced Technologies Ltd., Israel

[21] Appl. No.: 617,531

[22] Filed: Mar. 15, 1996

Related U.S. Application Data

[63] Continuation of Ser. No. 896,324, Jun. 10, 1992, abandoned.

[30] Foreign Application Priority Data

Jun. 19, 1991 [IL] Israel ............................................. 98560

[51] Int. Cl.⁶ .............................. B41J 29/38; B41J 25/00
[52] U.S. Cl. ................................................. 347/14; 347/37
[58] Field of Search ................................... 355/308, 309, 355/203; 347/8, 14, 37, 43

[56] References Cited

U.S. PATENT DOCUMENTS

| | | |
|---|---|---|
| 3,346,869 | 10/1967 | Stone . |
| 3,457,786 | 7/1969 | Trent . |
| 3,553,371 | 1/1971 | Suenaga . |
| 3,604,846 | 9/1971 | Behane et al. . |
| 3,864,692 | 2/1975 | McDonnell et al. . |
| 3,928,718 | 12/1975 | Sagae et al. . |
| 4,086,602 | 4/1978 | Yamada . |
| 4,307,407 | 12/1981 | Donahue et al. ........................... 347/74 |
| 4,364,055 | 12/1982 | Aiba ............................................ 347/6 |
| 4,384,295 | 5/1983 | Lewis et al. . |
| 4,540,996 | 9/1985 | Saito . |
| 4,547,786 | 10/1985 | Logan et al. . |
| 4,620,198 | 10/1986 | Behun ........................................ 347/43 |
| 4,622,561 | 11/1986 | Koike . |
| 4,672,390 | 6/1987 | Ishikawa ................................... 347/74 |
| 4,734,868 | 3/1988 | DeLacy ..................................... 395/111 |
| 4,811,038 | 3/1989 | Gordon et al. . |
| 4,812,918 | 3/1989 | Carbone .................................... 358/293 |
| 4,847,631 | 7/1989 | Naruse et al. ............................. 347/49 |
| 4,857,715 | 8/1989 | Koch et al. ............................... 235/456 |
| 4,896,173 | 1/1990 | Shinada et al. ........................... 346/154 |
| 4,920,258 | 4/1990 | Saito .......................................... 346/134 |
| 4,975,780 | 12/1990 | Kuboki ...................................... 358/296 |
| 5,172,238 | 12/1992 | Kuboki ...................................... 347/3 |
| 5,177,508 | 1/1993 | Bacus et al. .............................. 346/160 |
| 5,210,583 | 5/1993 | Monma ..................................... 355/309 |
| 5,343,227 | 8/1994 | Hirosawa et al. ........................ 347/42 |
| 5,402,164 | 3/1995 | Mutoh ....................................... 347/81 |

FOREIGN PATENT DOCUMENTS

| | | |
|---|---|---|
| 0023433A2 | 2/1981 | European Pat. Off. . |
| 0036787A1 | 9/1981 | European Pat. Off. . |
| 0 036 787 B1 | 6/1985 | European Pat. Off. . |
| 0 036 788 B1 | 7/1985 | European Pat. Off. . |
| 0360169 | 9/1989 | European Pat. Off. . |
| 0394634 | 2/1990 | European Pat. Off. . |
| 0391276 | 3/1990 | European Pat. Off. . |
| 2025686 | 9/1970 | France . |
| 58-140260 | 8/1983 | Japan . |
| 61-179 272 | 8/1986 | Japan . |
| 62-243 890 | 10/1987 | Japan . |
| 63-145 379 | 6/1988 | Japan . |
| 1289698 | 9/1972 | United Kingdom . |
| 1 432 366 | 4/1976 | United Kingdom . |

OTHER PUBLICATIONS

"Ink Jet Color Copier and Universal Printer", R.C. Pearson et al., *IBM Technical Disclosure Bulletin*, vol. 16, No. 1, Jun. 1973, pp. 144–145.

*Primary Examiner*—William J. Royer
*Attorney, Agent, or Firm*—Merchant, Gould, Smith, Edell, Welter & Schmidt, P.A.

[57] ABSTRACT

An apparatus for printing large graphics, particularly in colors, comprises at least a printing station, means for supporting a print substrate in continuous sheet form and for imparting thereto an intermittent, incremental, longitudinal feed motion, whereby intermittently to feed it in front of the printing station, means for imparting to the printing station an alternating, transversal, scanning motion relative to the print substrate, means for synchronizing said alternating, scanning and said incremental, feed motions, and means for controlling said printing station to deposit ink dots on the surface of said material in such a way as to produce the desired graphic patterns.

10 Claims, 3 Drawing Sheets

APPARATUS AND PROCESS FOR PRINTING LARGE GRAPHICS

This is a File Wrapper Continuation application of application Ser. No. 07/896,324, filed Jun. 10, 1992 now abandoned.

BACKGROUND OF THE INVENTION

1. Field of the Invention

This invention relates to apparatus and process for printing large graphics, such as billboards, outside advertising matter, signs and displays of various kinds, such as used in public areas and the like. More particularly, it relates to such an apparatus and a process which is adapted to reproduce on a large scale any desired colored signs and or pictures on a flexible substrate, such as paper.

2. The Prior Art

While the graphic art is very highly developed and has achieved high quality technical results, the problem of printing large graphics and obtaining good results rapidly and economically has not found a completely satisfactory solution. Photographic techniques, such as those commonly used for small reproductions, are not adapted for large ones and, at any rate, are excessively expensive. Painting by hand, which is a method still resorted to in many cases, is obviously time-consuming and expensive.

Apparatus for printing large graphics has been described in the prior art. For instance, U.S. Pat. No. 3,553,371 discloses a method and device for enlarging multicolor printing, by scanning an original colored picture; separation of light beams corresponding to each spot of the original picture into primary colors, converting the light beam into electric signals representing density of each primary color, actuating spray guns, each assigned to a primary color, responsive to said electric signals, with proper time delay, so that a spot on a single printing medium, which corresponds to said scanned point of the original picture, is printed in an extremely enlarged dimension by said spray guns in multicolor.

U.S. Pat. No. 4,547,786 discloses an apparatus in which a plurality of vertical panels are passed in a closed path, in a succession of continuous revolutions, in front of an ink-jet printing station which is displaceable in a vertical direction by incremental displacements, amounting, e.g., to one-tenth of an inch per revolution of the panels. The printing station, when printing in colors, comprises several groups of printing heads, each color being provided by one of said groups, the different printing head groups being spaced vertically from one another, so that, once a color has been fed onto a horizontal line of a panel, the next color will be fed thereonto only after a certain number of revolutions of the panel. The incremental displacements of the printing station are therefore slaved to the revolutions of the panels. An advertising sign or billboard or the like may be made by joining several panels.

U.S. Pat. No. 4,811,038 discloses an apparatus which comprises a drum which revolves about a horizontal axis, onto which the print backing may be applied, and a printing station which is displaceable horizontally and comprises vertically spaced printing head groups for feeding the different colors. The printing station moves incrementally in a horizontal direction by a given distance for each revolution of the drum, and once a color has been printed on a peripheral circle of the print backing applied on the drum, a certain number of revolutions, e.g. twenty, of the drum will have to take place before the same peripheral circle is imprinted with the next color. The incremental displacements of the printing station are therefore slaved to the revolutions of the drum.

The apparatus of the aforesaid patents are not wholly satisfactory, for a number of reasons. They are mechanically cumbersome and slow. The printing station "scans" straight lines or circles on the material to be printed, but the scanning is produced by keeping the printing station still, during each scanning, and moving it incrementally between successive scannings, so that in fact the scanning motion is that of the print backing, which involves the motion of fairly cumbersome mechanical elements. Each scanning requires in all cases at least a complete traversing of the breadth of the print backing. Secondly, the accurate registration of the various colors requires extreme precision in the mechanical movements. If twenty revolutions of the panels of the first mentioned U.S. patent or twenty revolutions of the drum of the second mentioned U.S. patent must occur between feeding two different colors on the same scan line, it is clear that any play or inaccuracy in the mechanical movements which occurs during a revolution is multiplied and the registration of the different colors is made difficult and dependent on extreme mechanical accuracy, which in turn requires expensive apparatus. Although the mass of the print backing may be small, that of the mechanical parts which actuate the backing is considerable, and their speed must be contained so as to avoid vibrations and deformations. The length of the sheets, or other print backing that can be used, is limited, such as the number of panels, in U.S. Pat. No. 4,547,786, or the radius of the drum, in U.S. Pat. Nos. 3,553,371 and 4,811,038, are limited. Further, with the apparatus described in the aforementioned U.S. patents, the number of points or ink drops per unit area of the pixels is limited, e.g., as described in U.S. Pat. Nos. 4,547,786 and 4,811,038, if the pixels are squares of one-tenth of an inch size, each of them will receive nine ink drops, viz. can be represented by a 3×3 matrix.

It is a purpose of the present invention to provide an apparatus and process for printing large graphics, which are free of the aforementioned drawbacks, and are mechanically simple and economical and yet provide excellent graphic results.

It is another object of the present invention to provide such an apparatus and process which can operate at high speed and are economical.

It is a further object of the present invention to provide such an apparatus and process in which there are ideally no limits to the length of the material to be printed.

It is a still further purpose of the invention to provide such an apparatus and process which solves all the problems of the registration of the various colors.

It is a still further purpose of the invention to provide an apparatus and process whereby inaccuracies and plays in the motions of the mechanical parts which carry the print backing or substrate have no substantial influence on the registration of the various colors.

It is a still further purpose of the present invention to provide an apparatus and process which permits to obtain printed graphics that can be viewed, both at a great distance and at a relatively short distance, with results equally pleasing to the eye.

It is a still further purpose of the invention to provide an apparatus and process which permits to obtain high quality half-tone prints.

Other purposes and advantages of this invention will appear as the description proceeds.

SUMMARY OF THE INVENTION

The apparatus according to the invention is characterized in that it comprises at least a printing station, preferably comprising a plurality of printing heads, means for supporting a print substrate, preferably in continuous sheet form, and for imparting thereto an intermittent, incremental, feed motion, whereby intermittently to feed it in the proximity of the printing station, means for imparting to the printing station an alternating, scanning motion relative to the print substrate, means for synchronizing said alternating, scanning and said incremental, feed motions, and means for controlling said printing station to deposit ink dots on the surface of said material, in synchronism with said alternating, scanning and said incremental, feed motions, in such a way as to produce the desired graphic patterns. Preferably a plurality of printing stations is provided, at least one of them corresponding to each color to be used in the printing, though multicolor printing stations can also be used.

In this application, "longitudinal" means in the direction of the feed motion of the print substrate and "transverse" means in a direction perpendicular to it, viz. across the breadth of the print substrate. By "printing head" is meant herein a device which comprises an ink orifice or nozzle and means for feeding it with ink and determining whether and where the ink drops ejected from said nozzle will be deposited on a substrate. A device which comprises a plurality of nozzles and means for feeding them concurrently with the same ink, will be called a "multiple printing head", no matter what its specific structure. A plurality of single or multiple printing heads physically connected or controlled so as to move together, constitute a "printing station", which can be monocolor, if the same color is ejected by all of them, or multicolor, if its heads feed all the colors required for the particular print to be made.

Said scanning motion and said incremental feed motion are preferably perpendicular to one another, the first being transverse and the second longitudinal, and so synchronized that the deposition of the ink dots on the surface of the print substrate will occur when this latter is standing still between successive, incremental, feed motions thereof. However, it is only necessary that the printing station have the desired scanning motion relative to the print substrate when it is operative to deposit ink on this latter, so that a more complicated motion could be imparted to the printing station, as long as that condition is observed. Further, the feed motion increments need not necessarily be all equal, but different increments and combinations of increments can be provided in different embodiments of the invention.

The process according to the invention comprises the steps of feeding with an intermittent, incremental, feed motion a print substrate, passing the same through a printing space, applying thereto, in said space, printing inks in successive scanning bands directed perpendicularly to said feed motion, the inks being applied in said bands in dot patterns, and controlling said dot patterns and the ratio of said increments of said feed motion to the width of said scanning bands, in such a way as to produce on the backing the desired print.

DETAILED DESCRIPTION OF PREFERRED EMBODIMENTS

In a preferred form of the invention, the print substrate is positioned below the printing heads in the part of the machine in which the deposition of the ink drops occurs (hereinafter called the "printing space"), and is maintained in a sufficiently tensioned condition to provide a substantially flat surface for receiving said ink drops, or other means, within the purview of the skilled person, are provided for the same purpose.

In a preferred form of the invention the printing heads are of the electrostatic, drop deviation type, e.g. of the type in which ink is flown continuously and is continuously discharged when no printing occurs, and is electrostatically charged and deviated in drop form by an electrostatic field, whenever a color dot is to be printed on the print substrate, to direct said drop to fall in a predetermined position among a number of possible positions to which it may be directed. Apparatus of this kind are known per se in the art and available on the market. If the head stands still, the possible trajectories of the ink drops issuing from one nozzle of the head all lie on one plane, which will be called "the axial plane" of the nozzle printing head. The intersection of that plane with the print substrate will be called the "axis" of the nozzle. If the printing head comprises only one nozzle, or is a single head, the axial plane and the axis of the nozzle will be considered as the axial plane and the axis of the head. The maximum distance between points of the print substrate on which the head is capable of depositing ink drops from one of its nozzles will be called "the deviation" of the head. It is obvious that the deviation depends on the distance of the head nozzle or nozzles from the substrate.

Preferably, the printing heads are adapted to deposit on the print substrate ink dots, the centers of which are spaced from one another by a distance of approximately 0.1 to 0.5 mm. Thus, if the pixels of the print are, for example, squares having a size of one-tenth of an inch, there will preferably be from 25 to 625 dots in each pixel or, in other words, each pixel can be considered as a matrix having from 25 to 625 cells.

Preferably, the printing heads are so mounted that their (nozzle) axes are parallel to the substrate, viz. to the direction of the feed motion—briefly, they will be said to be "longitudinal printing heads". In a further form of the invention, several multiple printing heads or monocolor printing stations are provided for each color in longitudinally spaced relationship, and each increment of the feed motion is related to the width of said bands in a manner that will be explained hereafter.

The speed of the alternating scanning motion of the printing stations can vary very widely. Generally, it is at least 1 meter per second and preferably from 1 to 6 mt/sec.

The term "pixel" means herein the smallest area of the print for which chromatic information is available. If the print pattern is defined by scanning an original, the scanning provides chromatic information with a certain resolution, viz. defines the chromatic intensity of each basic color (usually magenta, cyan, yellow and black) in a certain elementary area of the original and then move on to another area of equal size. Said information will be used to control the printing in an area of the substrate that is equal to the elementary area of the original multiplied by the area enlargement. Said substrate area is the pixel. If the print pattern is obtained in another manner, e.g. is created by means of a computer, the information defining it it will likewise comprise items of chromatic information each defining the intensity of all the basic colors at the same point of the print and the print area to which each of information items will apply, and said print area will be the pixel. The pixels are generally considered to be squares. The print consists of transverse bands the width of which is equal to the side of a pixel. The increments of the print substrate feed motion are usually equal to the side of a pixel or to a multiple thereof, depending on the particular form of the invention, as will be better understood as the description proceeds. However, this way of analyzing the parameters of the invention is not binding and is adopted only for the sake of simplicity.

In a preferred form of the invention, the exact position of the print substrate is monitored, e.g. by means of photoelectric cells, and the operation of the printing stations is controlled as a function of the relative position of this latter relative to the substrate, conveniently by determining when a given point of any particular printing station reaches the edge of the substrate, whereby any lateral displacement of the substrate with respect to the organs which support it and feed it has no influence on the accuracy of the printing.

The control of the operation of the several printing heads to obtain the desired graphic patterns can be carried out by means known in the art. Thus, the patterns may be defined by an electronically registered program, obtained by any known means, or a graphic original may be used and the information obtained from it by means of a scanner. The operation of such a scanner and the way in which it can control the actuation of printing heads are well known in the art, and are e.g. further described in the aforementioned U.S. Pat. Nos. 3,553,371 and 4,547,786. Half-tone images can be obtained by the means described in U.S. Pat. No. 3,604,846, or by any other means known in the art.

Preferably, in carrying out this invention, the inks are applied by causing them to flow continuously through printing heads from a nozzle to a discharge and applying to them an electrostatic charge and deviating the charged inks by means of an electrostatic field so as to cause them to impinge on predetermined points of the print substrate, whenever a dot is to be formed thereon to form the desired dot patterns.

The dot patterns formed by the inks are controlled, so as to obtain the desired print, by controlling the application of the electrostatic charges and the consequent deviations of the ink trajectories, in synchronism with the aforementioned scanning and feed motions, by electronic computer means, actuated by a predetermined program or by information provided by a scanner which scans an original to be reproduced. The scale of said patterns is influenced by the distance of the print substrate from the printing head, as will be further explained hereinafter with reference to FIG. 2.

Figure 1:
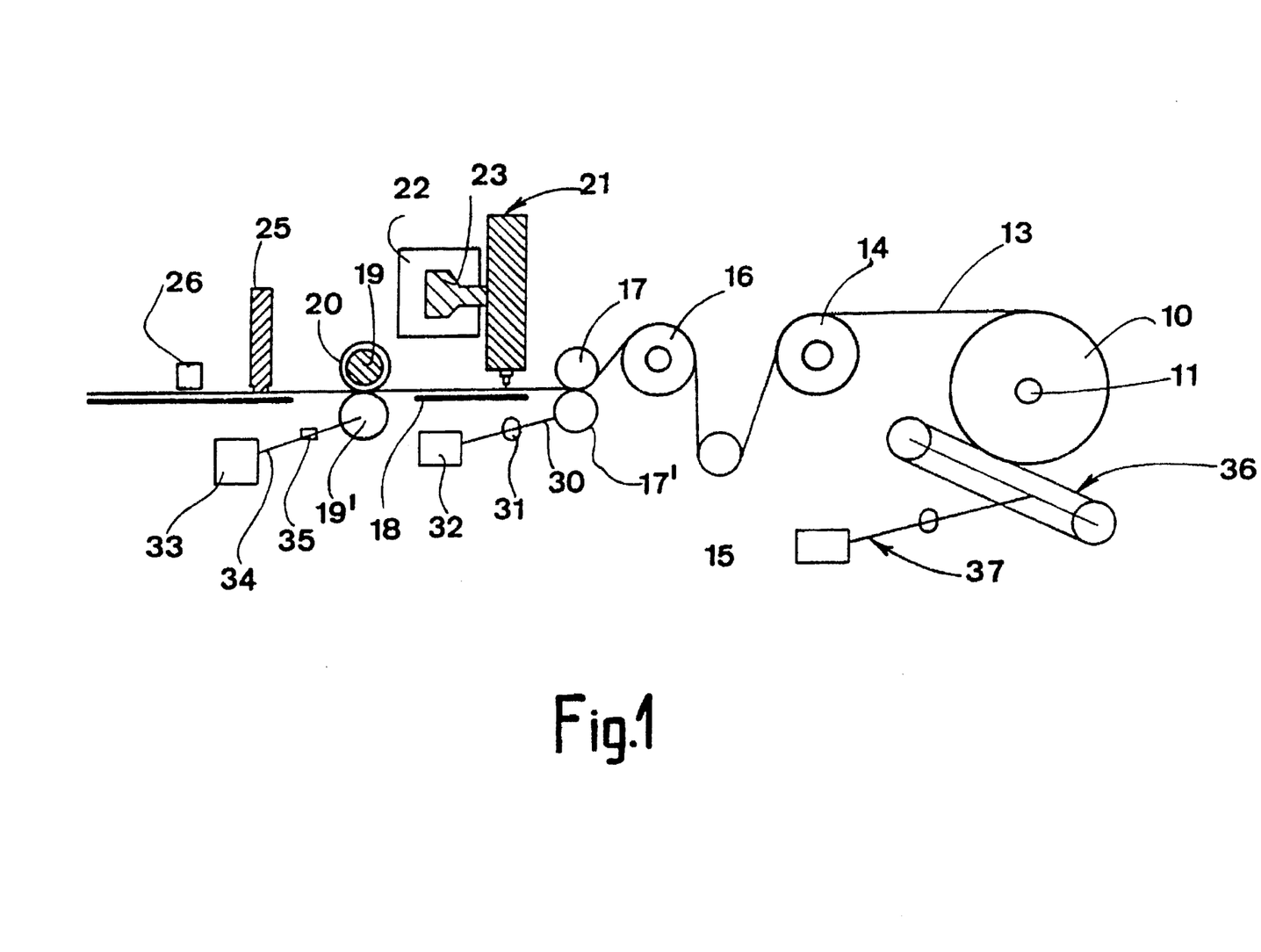
FIG. 1 is a schematic representation of an embodiment of an apparatus according to the invention, seen in longitudinal elevation and part cross-section.

With reference to the schematic representation of FIG. 1, 10 indicates a roll of print substrate, usually heavy paper adapted for printing billboards and the like, but also, possibly, other continuous sheet material made e.g. of plastic or laminates or any suitable material, which is mounted on a support which may be driven for rotation, but is preferably freely rotatable about an axis 11 and caused to rotate by suitable means, such as by a belt generally indicated at 36 and urged against the outer surface of the roll by a counterweight device generally indicated at 37. The print substrate 13 passes over a guide roller 14 and under a tensioning roller 15 which is supported, e.g., on a swinging arm, so as to be freely oscillatable in a substantially vertical direction to impart to the print substrate 13 a suitable tension between roller 14 and a subsequent guide roller 16.

The substrate is then engaged by a feed device, which imparts to it the incremental feed motion. The art know may such devices: as a schematic example only, FIG. 1 illustrates a pair of feed rollers 17–17', which exert a feed pressure the one on the other. Said pressure can be created in any one of the many ways known in the art, e.g. by means of springs which urge the axis of one roller towards that of the other, or by hydraulic pressure, or, as schematically shown in FIG. 1, by supporting one of the rollers (the lower roller 17', in the figure) on an arm 30, pivoted at 31 to the a stationary part of the machine and loaded by counterweight 32. Conveniently, one the the rollers, e.g. roller 17', is made of metal, and the other is made of an elastic material, preferably rubber but alternatively a suitable plastic, which elastic material has a sufficient rolling friction coefficient relative to the substrate. However, other solutions could be adopted, and e.g. both rollers could be made of metal. Obviously, the pressure that the rollers must exert on one another is related to the friction coefficient between them and the substrate, both factors contributing to draw exerted by the rollers on the substrate. Said draw is the tangential force due to the friction, which is equal to the product of the friction coefficient and the force exerted by the rollers on the substrate, and it must not be smaller, and is desirably greater, than the tension of the substrate, created as explained hereinafter. The feed device is preferably actuated by an electronically controlled motor, in a manner known to skilled persons, and is synchronized by computer means with the motions of the printing heads, in a way readily carried into practice by persons skilled in the art, to produce the desired printed patterns.

From the feed device, the print substrate 13 travels on a fiat supporting surface 18. In the schematic drawing of FIG. 1, the substrate is shown for the sake of clarity as spaced somewhat from the surface 18, but in practice it is in contact therewith and slides thereon. The substrate is then engaged by a tensioning device, of any suitable kind, shown by way of example as being constituted by a second pair of rollers 19–19'. Said tensioning rollers also exert a pressure on one another in any suitable way, e.g. as schematically shown, by means of a counterweight 33, mounted on a lever 34 pivoted at 35 and which carries roller 19' at the end opposite the counterweight. In the embodiment shown, roller 19 is provided with annular projections 20 which contact the substrate. These rings may be slidably slanted with respect to the longitudinal direction in order to impart to the backing a desirable transverse tension, or this may not be necessary or other means may be used for that purpose. Roller 19' is also preferably made of metal and roller 19 of an elastic material, such as rubber. The tensioning device should preferably be adapted to create a controllable tension in the substrate. For this purpose, the rollers (or other mechanical elements used to engage the substrate) may be actuated through an electromagnetic or hydraulic clutch, which can transmit a torque up to a controllable value and will slip if said value is insufficient to actuate said elements—such devices being conventional in the art. Preferably, however, the motor which provides the power for actuating the rollers is controlled electronically, quickly to rotate the same if the tension of the substrate, sensed by a suitable sensor, is less than required and quickly to stop once the tension has reached the required, controllable value. Such electronic controls too are known in the art.

Numeral 21 generally indicates a printing station, comprising one or more heads, the nozzle axial planes of which are longitudinal and to which a transverse motion is imparted. While only one such station is shown, for the sake of simplicity, it is to be understood that several such stations, in any desired number, will generally be provided. While one station may print all the desired colors, it is preferable that each station print one color only. In that case, for multicolor printing, several stations like station 21—at least one for each basic color—will be provided in longitudinal succession along the the printing machine, and the apparatus of FIG. 1 should be construed as comprising several such stations.

Numeral 22 schematically indicates guide means on which the printing stations 21 slide and 23 schematically indicates the portion of the printing station's supporting structure which engage the guide means 22. The actual structure of the printing stations and of their supports may vary considerably, depending on the particular heads that are used and on their disposition and on the combinations of the various heads. The stations are, of course, fed with the appropriate colors, in a conventional way, not illustrated.

Figures 2, 3, 4:
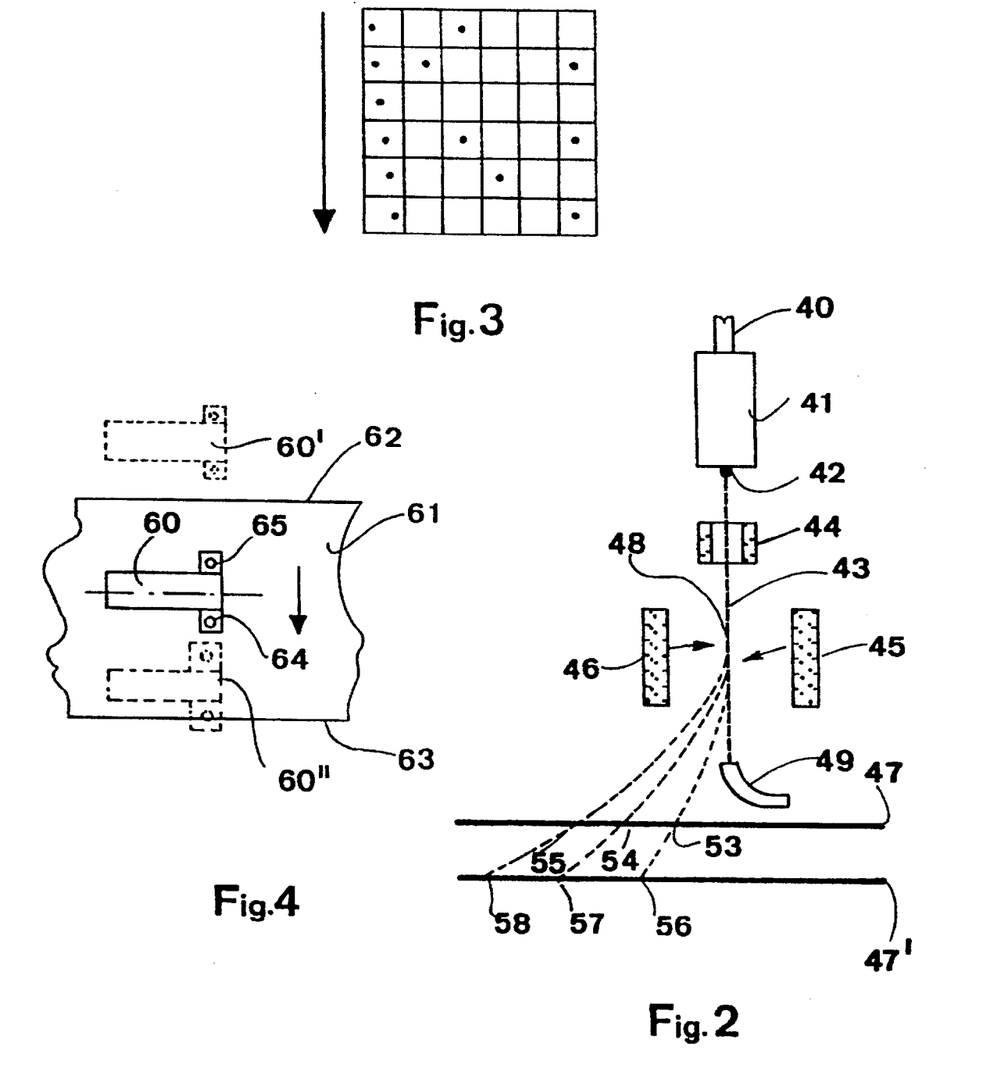
FIG. 2 is schematic illustration of a printing head of a type preferably used for carrying the invention into practice.
FIG. 3 illustrates the composition of a pixel in an embodiment of the invention.
FIGS. 4 to 7 schematically illustrate various possible arrangements of printing heads in various embodiments of the invention.

The printing occurs in the printing space between the rollers 17 and 20. Thereafter, the print substrate is intermittently cut by a knife, schematically indicated at 25, to the desired piece length. To facilitate the cut, the substrate is preferably engaged and held during the cut by a pressor 26. In other embodiments of the invention, the cutting might not occur and the printed substrate might be in the form of another roll, but in general, it is cut to provide a number of separate graphic units, to be used on billboards and the like. FIG. 2 schematically illustrates the electrostatic, drop deviation jet-printing method preferably employed in carrying out the invention. In each single printing head, ink is fed continuously through a pipe 40 to a control unit 41', which feeds it to a nozzle 42, from which it issues in the form of drops as indicated at 43, which are collected by a discharge conduit 49, when the head is not activated for printing. The drops pass through charged electrode 44 which charges them electrostatically when the head is activated, and then through deflector plates 45–46, which produce an electrostatic field, when the head is activated, and, according to the intensity of that field, deviate the ink drops to various trajectories, so that they impinge on a print substrate 47 in a variety of more or less deviated positions, such as 53, 54 and 55. 48 is the point from which the trajectories diverge. Assuming that 53 is the least deviated and 55 is the most deviated trajectory, the distance between points 53 and 55 is the deviation for the position 47 of the substrate. If the substrate is placed farther away from the head nozzle, e.g. in the position 47' shown in broken lines in the figure, the trajectories illustrated will impinge on it at points 56, 57 and 58 the distance 56–58 will become the deviation, and the area which can be covered by the printing head will be proportionally greater. However, it will not increase linearly, but faster than linearly, because the ink drop trajectories are not rectilinear, but approximately parabolic, as shown. It will be clear from the foregoing that FIG. 2 is a cross-section taken on the axial plane of the head and the lines 47 and 47' are the axes of the head in the two illustrated positions of the substrate. It will also be apparent that if a plurality of orifices are controlled by unit 41, the head will be a multiple one, but its operation will be essentially the same. By suitably determining the distance of the print substrate from the head nozzles, two adjacent heads may be caused to produce print bands which border on one another to create wider bands. This will occur when the (most deviated) point 58 of one head will become adjacent to the (least deviated) point 56 of the other. Heads such as that described can deposit a great number of drops in a very short time, e.g. up to 64000–128000 drops per second, or more.

FIG. 3 schematically illustrates, at a greatly enlarged scale, a pixel which, by way of example, is assumed to contain up to 36 dots. If 36 dots are actually printed, the maximum chromatic intensity is achieved, while said intensity decreases if the number of dots decreases. In the drawing, the pixel has been divided, for purposes of illustration, into 36 squares, each of which can receive one drop, and may be considered as a 6×6 matrix. The arrow indicates the longitudinal direction (perpendicular to the scanning motion). The number of dots which are deposited in each pixel is determined by the color intensity index relative to the color and the pixel considered. However, for a given color index and therefore a given number of dots per pixel, the distribution of the dots in the various cells of the pixel matrix may vary, and according to conventional methods which controls the printing selects in a random manner the particular pixel matrix to be created at any given point of the substrate by the ink dots—although methods are disclosed in the art which involve some departures from a purely random selection. In order that the maximum chromatic intensity may be attainable, the printing head must be able to deposit 36 ink drops in the time in which the scanning motion covers the length of the pixel. Assuming, by way of example, that said length is 2.5 mm, and that the scanning speed is 1 mt/sec, the printing head need only be capable of depositing 40×36=1440 drops in a second. In FIG. 3 only in the left-hand column (by "column" is meant a succession of squares aligned in the longitudinal direction) the dot density is maximum. It is seen that the dots are distributed in the squares, which represent the ideal cells of said column of the matrix, in a slightly inclined line, viz. they are offset from one another in the direction of the scanning motion by the distance by which the printing head travels between the deposition of two successive dots: in this example, 1/36th of the side of the pixel.

The scanning motion is preferably monitored by a digital sensor, viz. any suitable device which is adapted to sense and to signal each displacement of printing station, in the scanning motion thereof, that is equal to the side of one (ideal) cell of the pixel: in this example, 1/6 of the pixel side. Such a device may include a small wheel, which rotates with the linear motion of the printing station, and a sensor associated with it, which senses each rotation of the wheel by an angle corresponding to said displacement and transmits a corresponding signal to the printing head control. This affords real time coordination of the scanning motion and of the drop ejection of the printing heads.

The printing heads could be controlled in such a way that they will be active during one stroke of the printing station and inactive during the return stroke. In this case, the width of the transverse strip printed by a head of the type of FIG. 3 is equal to its deviation. However, it may be preferable, as hereinafter explained, to actuate the heads to eject ink drops during all strokes. In this case, each head will print two bands between each two successive increments of the feed motion, and the width of each band will be a fraction, e.g. one half of its deviation.

The ink-jet printing head used according to the invention, be they of the type illustrated in FIG. 2 or of another type capable of a similar operation, have a certain speed, viz. are capable of ejecting and selectively deviating, to impinge on the print substrate at the desired spots, a certain number of drops per unit time, as noted hereinbefore. The number of possible deviations of the drop trajectories along the head axis determines the number of drops which can be included in each pixel, viz. the number of cells in the matrix which represents a pixel. In the method according to the invention, the printing heads are actuated in their scanning motion with such a speed, that the time required for the heads to traverse a distance equal to the side of a pixel cell not be less than the time required for the head to eject and selectively deviate a number of drops equal to the number of cells in each column of the pixel, the square of which number represents the maximum color intensity index.

FIGS. 4 to 7 illustrate schematically some possible dispositions of printing heads in printing stations, the arrows indicating the transverse direction—the direction of the scanning motion. All the printing heads in these figures are schematically indicated by rectangles, their axis being indicated by dash-and-dot lines. It will be seen that all heads are longitudinal, viz. their nozzle axes are parallel to the direction of the feed motion. Each rectangle in the above figures may indicate a single or a multiple head.

FIG. 4 shows a head 60 which prints on a continuous sheet 61, a fragment of which is shown. A photoelectric cell arrangement is used to detect the position of the edges 62 and 63 of the paper sheet 61. A possible way of doing this, schematically indicated in the drawing, is to provide the printing head 60 with two photoelectric cells 64–65 which are sensitive to the light reflected by the paper. Before a scanning stroke in the direction of the arrow begins, the head is located in the position 60', shown in broken lines, and in the course of the scanning motion, the photoelectric cell 64 will pass over the edge 62 of the paper and will give a signal which permits to the control to actuate the printing head, after a suitable interval required for the head axis to reach the edge of the paper, or at any rate the position at which the printing must begin. Likewise, when the printing head reaches the position indicated in broken lines at 60", the photoelectric cell 64 will sense the edge 63 and signal that it is about to leave the zone occupied by the paper and the control will discontinue the ejection of ink drops after a suitable delay to permit the printing of the entire scanning band to be completed. The said operations occur symmetrically when the head returns, in the next stroke to position 60', cell 65 being now active to signal the paper edges. For multicolor printing, several heads like head 60—at least one for each basic color—will be provided in longitudinal succession along the the printing machine. The head is preferably used to print on a band having a width equal to the pixel side during the motion in the direction of the arrow and an adjacent band of equal width during the motion in the opposite direction. Therefore, the increments of the substrate feed motion are equal to twice the pixel side and the deviation of the head is at least equal to one of said increments.

Figure 5:
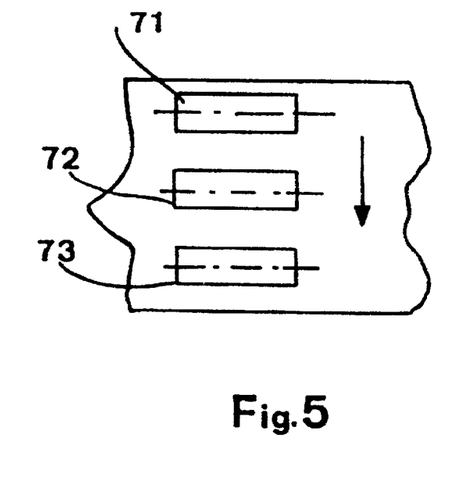

In FIG. 5 a similar arrangement is shown, but instead of one (single or multiple) printing head, there are a plurality of printing heads 70, 71, 72, etc., in any desired number, all printing the same color. In this case, obviously, the scanning stroke will be smaller and instead of being equal to the width of the paper, plus the distances required to permit the printing head to be stationed off the paper at the beginning and end of a stroke, it will be equal to the interaxial distance between adjacent heads, plus the aforesaid additional distances. By "interaxial distance between adjacent heads" is meant herein the distance between the centres of the nozzles (or the corresponding nozzles, if each head is multiple) of two adjacent heads, viz. the distance by which one head would have to travel, if the adjacent head were removed, to occupy the place of this latter. For simplicity's sake, the photoelectric cells are omitted in FIGS. 5 to 7, but they will ordinarily be present. For multicolor printing, several groups of heads like 71-72-73 etc. at least one group for each basic color—will be provided in longitudinal succession along the the printing machine.

Figure 6:
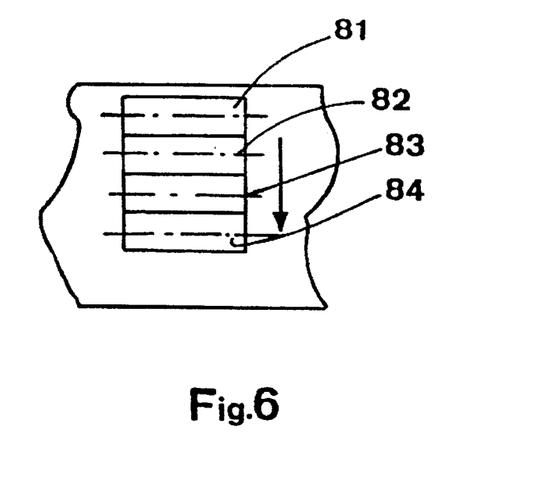

FIG. 6 shows an arrangement which is the same as that of FIG. 4, except that instead of one (single or multiple) printing head, there are a plurality of printing heads indicated at 81, 82, 83 and 84, each of which prints with one of the desired colors, typically magenta, cyan, yellow and black. Said heads may be placed in mutually abutting relationship, as shown in FIG. 6, or they may be somewhat spaced from one another. It will be understood that in this case, and particularly if the heads are placed in abutting relationship, very quickly drying inks must be used, or the scanning motion must be very slow, or both, because each color will be printed immediately over the preceding one. Since a quickly drying ink will dry in 1.5 seconds, it is seen that the scanning motion will have to be slow in any case. It has been surprisingly found, however, that one can print one color over another, even if the first one has not dried, and this is one of the aspects of the method according to the invention. Therefore, high speed scanning motions can be maintained in any case. The drying of the inks may be accelerated by heating, e.g. by infrared or microwave heating, but this is possible only if significant convective motions are avoided, since these would disturb the trajectories of the ink drops and interfere with the delicate functioning of the printing heads.

Figure 7:
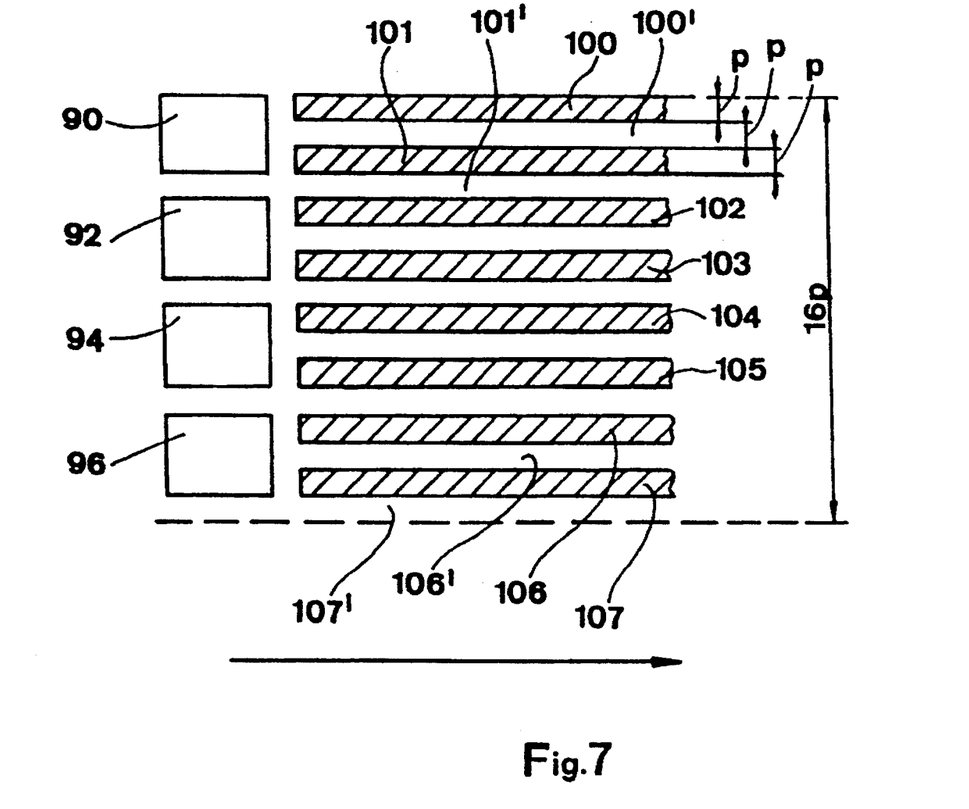

Different arrangements of printing heads can be adopted, and some of them may require that the feed motion of the print substrate take place by increments that are not all equal. An example is illustrated in FIG. 7. 90, 92, 94 and 96 schematically indicate the components of a quadruple printing head, each component having one nozzle. The arrow indicates the scanning motion. The head is so controlled that during one stroke (the rightward stroke, as seen in the drawing) components 90, 92, 94 and 96 will print respectively on bands 100, 102, 104 and 106 (only an initial portion of which is shown), "p" being the width of each band—exaggerated in the drawing for purposes of illustration—and also the distance between successive bands. During the return (leftward) stroke, said component will print respectively on bands 101, 103, 105 and 107. This obviously requires each component have a deviation that is equal to 3p, only one third of which is used in each scanning stroke. Thereafter, the print substrate is fed forward by an increment equal to p. The components 90, 92, 94 and 96 will now print respectively, during the first stroke on bands 100', 102', 104'and 106', and during the return stroke, on bands 101', 103', 105' and 107'. Thereafter the print substrate will be fed forward by an increment equal to 16p and the head will controlled as before to print on a zone equal to that shown on the drawing, but beginning where band 107' ends, viz. at the line indicated in broken line as X—X, and the operations described will be repeated cyclically. In general, in an arrangement such as that of FIG. 7, if "n" is the number of nozzles in each head, the increments of the feed motion are alternatively equal to p and to 2np. The multiple head 90-92-94-96 prints one color. At least one, but possibly more, such multiple heads may be provided for each color, and the several heads will be disposed in longitudinal succession, with proper spacing, along the printing apparatus.

A variety of different arrangements of nozzles and printing heads may of course be devised by skilled persons.

The invention is further illustrated by the following non-limitative examples.

EXAMPLE 1

Billboards 2.5 meters high and 5 meters long, obtained by assembling 5 pieces having the dimensions 2.5×1 mt. They are printed using the basic colors magenta, cyan, yellow and black. The print substrate is a continuous sheet 1 meter wide, of chromo paper, weighing 115 gr/sq.mt., to be cut to strips 2.5 meters long. The arrangement of the heads adopted is that of FIG. 7. The quadruple heads used are of the "Mail-jet" type, manufactured by the Imaje Company. The inks employed are on basis MEK. The feed motion is an incremental one and the small increments "p" are equal to 2.5 mm., the large increments being 16p=40 mm The scanning motion has a speed of 1.4 mt/sec. The pixel side is 2.5 mm. The number of dots per each pixel is 49 viz. the pixels are 7×7 matrices. The paper is placed at such a distance from the heads that the deviation of these latter is equal to 7.5 mm.

EXAMPLE 2

Billboards having the same dimensions as in Example 1 are obtained by printing with the same four basic colors, magenta, cyan, yellow and black, on a print substrate which is a continuous vinyl sheet 1 meter wide, weighing 150 gr/sq.mt., to be cut to strips 2.5 meters long. The arrangement of the heads adopted is that of FIG. 4, using four single heads disposed in longitudinal succession. The quadruple heads used are of the Codebox, manufactured by the Domino Company. The inks employed are the same as in Example 1. The pixel side is 2.5 mm. The feed motion is an incremental one and the increments are equal to 2 pixel sides, viz. to 5 mm. The scanning motion has a speed of 1.2 mt/sec. The number of dots per each pixel is 49, viz. the pixels are 7×7 matrices. The paper is placed at such a distance from the heads that the deviation of these latter is equal to 5 mm.

While a number of embodiments of the invention have been described for purposes of illustration, it will be clear that the invention can be carried out by a person skilled in the art with many modifications, variations and adaptations, without departing from its spirit or exceeding the scope of the appended claims.

I claim:

1. Apparatus for printing large graphics, particularly in colors, comprising;.

at least one printing station;

means for supporting a print substrate in continuous sheet form and for imparting thereto an intermittent, incremental longitudinal feed motion, whereby intermittently to feed it in front of the printing station;

said printing station comprising at least one ink-jet printing head provided with means for continuously ejecting ink drops towards said print substrate and for electrostatically deviating said drops, when desired to a selected extent, in an essentially longitudinal direction;

means for imparting to the printing station a continuous, transversal, scanning motion alternatingly across said print substrate;

means for synchronizing said continuous scanning motion and said incremental feed motion;

means for either deviating or not deviating said ink drops whereby to either deposit in a longitudinal position corresponding to the selected extent of electrostatic deviation or not to deposit the ink drops on the surface of said substrate, when this latter is standing still between successive, incremental feed motions thereof, in such a way as to produce on said substrate a predetermined graphic pattern;

wherein a speed of alternating scanning motion of the printing station is at least 1 mt/sec.

2. Apparatus for printing large graphics, particularly in colors, comprising:

at least one printing station;

means for supporting a print substrate in continuous sheet form and for imparting thereto an intermittent, incremental longitudinal feed motion, whereby intermittently to feed it in front of the printing station;

said printing station comprising at least one ink-let printing head provided with means for continuously ejecting ink drops towards said print substrate and for electrostatically deviating said drops, when desired to a selected extent, in an essentially longitudinal direction;

means for imparting to the printing station a continuous, transversal, scanning motion alternatingly across said print substrate;

means for synchronizing said continuous scanning motion and said incremental feed motion;

means for either deviating or not deviating said ink drops whereby to either deposit in a longitudinal position corresponding to the selected extent of electrostatic deviation or not to deposit the ink drops on the surface of said substrate, when this latter is standing still between successive, incremental feed motions thereof, in such a way as to produce on said substrate a predetermined graphic pattern;

wherein each of the printing heads comprises at least one nozzle and means for ejecting the ink drops from said nozzle and for deviating them, when required, to a selected one among several possible trajectories, all of said trajectories lying substantially on an axial plane of said nozzle;

means for monitoring the scanning motion of the printing stations and signalling each displacement thereof equal to a side of a pixel cell; and means for actuating each printing head nozzle to deposit on the substrate, for each of said displacements, the number of dots required by the color intensity of said pixel.

3. Apparatus for printing large graphics, particularly in colors, comprising:

at least one printing station;

means for supporting a print substrate in continuous sheet form and for imparting thereto an intermittent, incremental longitudinal feed motion, whereby intermittently to feed it in front of the printing station;

said printing station comprising at least one ink-jet printing head provided with means for continuously ejecting ink drops towards said print substrate and for electrostatically deviating said drops, when desired to a selected extent, in an essentially longitudinal direction;

means for imparting to the printing station a continuous, transversal, scanning motion alternatingly across said print substrate;

means for synchronizing said continuous scanning motion and said incremental feed motion; and means for either deviating or not deviating said ink drops whereby to either deposit in a longitudinal position corresponding to the selected extent of electrostatic deviation or not to deposit the ink drops on the surface of said substrate, when this latter is standing still between successive, incremental feed motions thereof, in such a way as to produce on said substrate a predetermined graphic pattern;

wherein the incremental feed motion of the print substrate takes place by displacements by multiples of one pixel side.

4. Process for printing large graphics, particularly in colors, which comprises the steps of:

feeding with intermittent, incremental motion a continuous print substrate;

passing said substrate through a printing space;

continuously ejecting ink drops in said space, towards said substrate, electrostatically deviating part of said drops whereby to print on said substrate dot patterns in successive scanning bands directed perpendicularly to said feed motion; and controlling said electrostatic deviations of said drops and therefore said dot patterns in such a way as to produce on said print substrate a predetermined graphic pattern;

wherein inks of the ink drops have a drying time not greater than 3 seconds and preferably 1.5 seconds.

5. Process for printing large gaphics, particularly in colors, which comprises the steps of:

feeding with intermittent, incremental motion a continuous print substrate;

passing said substrate through a printing space;

continuously ejecting ink drops in said space, towards said substrate, electrostically deviating part of said drops whereby to print on said substrate dot patterns in successive scanning bands directed perpendicularly to said feed motion; and controlling said electostatic deviations of said drops and therefore said dot patterns in such a way as to produce on said print substrate a predetermined graphic pattern;

wherein the dot patterns formed by inks of the ink drops are controlled, so as to obtain a desired print, by controlling an application of the electostatic changes and consequent deviations of the inks, in synchronism with the scanning and feed motions, by electronic computer means, actuated by a predetermined program or by information provided by a scanner which scans an original to be reproduced.

6. Process for printing large graphics, particularly in colors, which comprises the steps of:

feeding with intermittent, incremental motion a continuous print substrate;

passing said substrate through a printing space;

continuously ejecting ink drops in said space, towards said substrate, electrostatically deviating part of said drops whereby to print on said substrate dot patterns in successive scanning bands directed perpendicularly to said feed motion; and controlling said electrostatic deviations of said drops and therefore said dot patterns in such a way as to produce on said print substrate a predetermined graphic pattern;

wherein the incremental motion of the substrate takes place by multiples of a pixel side.

7. Process for printing large graphics, particularly in colors, which comprises the steps of:

feeding with intermittent, incremental motion a continuous print substrate;

passing said substrate through a printing space;

continuously ejecting ink drops in said space, towards said substrate, electrostatically deviating part of said drops whereby to print on said substrate dot patterns in successive scanning bands directed perpendicularly to said feed motion; and controlling said electrostatic deviations of said drops and therefore said dot patterns in such a way as to produce on said print substrate a predetermined graphic pattern;

wherein each increment of the incremental motion of the substrate is equal to twice a side of a pixel.

8. Process for printing large graphics, particularly in colors, which comprises the steps of:

feeding with intermittent, incremental motion a continuous print substrate;

passing said substrate through a printing space;

continuously ejecting ink drops in said space, towards said substrate, electrostatically deviating part of said drops whereby to print on said substrate dot patterns in successive scanning bands directed perpendicularly to said feed motion; and controlling said electrostatic deviations of said drops and therefore said dot patterns in such a way as to produce on said print substrate a predetermined graphic pattern;

wherein n scanning bands are created concurrently and the increments of the incremental motion of the substrate are alternatively equal to one side of a pixel and to 2n times said side.

9. Apparatus for printing multi-color large graphics, particularly in colors, comprising;

at least one printing station;

means for supporting a print substrate in continuous sheet form and for imparting thereto an intermittent, incremental longitudinal feed motion, whereby intermittently to feed it in front of the printing station;

said printing station comprising at least one ink-jet printing head provided with means for continuously ejecting ink drops towards said print substrate and for electrostatically deviating said drops, when desired to a selected extent, in an essentially longitudinal direction;

means for imparting to the printing station a continuous, transversal, scanning motion alternatingly across said print substrate;

means for synchronizing said continuous scanning motion and said incremental feed motion;

means for either deviating or not deviating said ink drops whereby to either deposit in a longitudinal position corresponding to the selected extent of electrostatic deviation or not to deposit the ink drops on the surface of said substrate, when this latter is standing still between successive, incremental feed motions thereof, in such a way as to produce on said substrate a predetermined graphic pattern;

at least one printing station for each basic color, each printing station printing, for each scanning stroke in either direction of said printing station, a band of a predetermined width, and means for feeding the print substrate by increments alternatively equal to said width and to a multiple thereof.

10. Apparatus for printing multi-color large graphics, particularly in colors, comprising:

at least one printing station;

means for supporting a print substrate in continuous sheet form and for imparting thereto an intermittent, incremental longitudinal feed motion, whereby intermittently of feed it in front of the printing station;

said printing station comprising is one ink-jet printing head provided with means for continuously ejecting ink drops towards said print substrate and for electrostatically deviating said drops, hen desired to a selected extent, in an essentially longitudinal direction;

means for imparting to the printing station a continuous, transversal, scanning motion alternatingly across said print substrate;

means for synchronizing said continuous scanning motion and said incremental feed motion;

means for either deviating or not deviating said ink drops whereby to either deposit in a longitudinal position corresponding to the selected extent of electrostatic deviation or not to deposit the ink drops on the surface of said substrate, when this latter is standing still between successive, incremental feed motions thereof, in such a way as to produce on said substrate a predetermined graphic pattern;

wherein the means for imparting to the printing station the continuous transversal scanning motion impart to said station such a speed, that the time required for said station to move by a distance equal to the side of a pixel is not less than the time required for each printing head to eject and selectively deviate a number of drops equal to the number of cells in each column of the pixel.

* * * * *